H. TYREE.
GLASS CASKET.
APPLICATION FILED APR. 8, 1918.
1,365,633.  Patented Jan. 11, 1921.
3 SHEETS—SHEET 1.
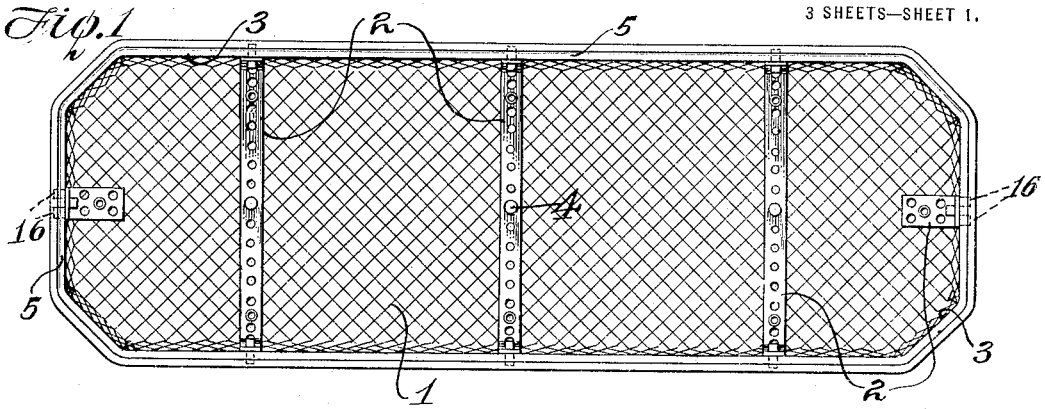
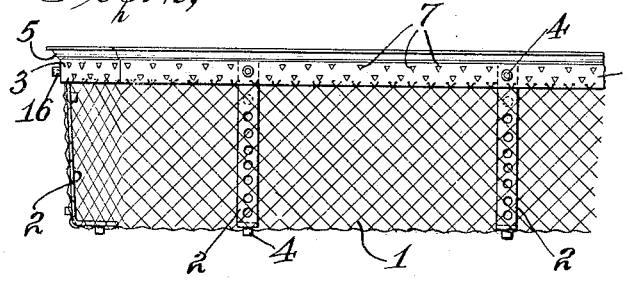
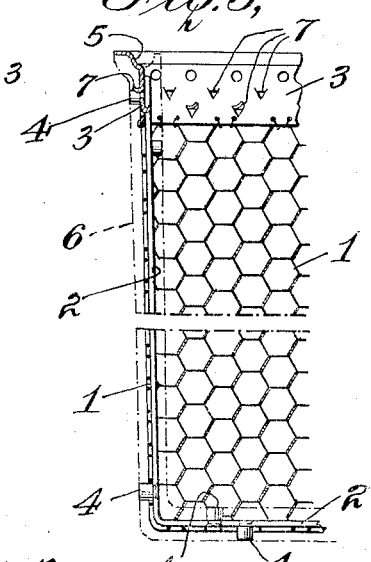
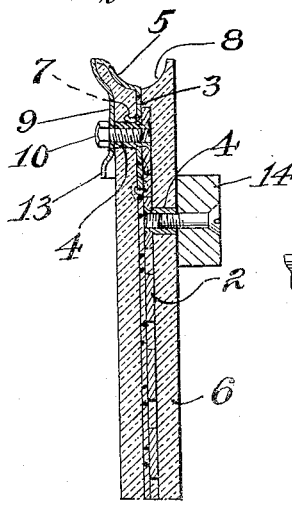
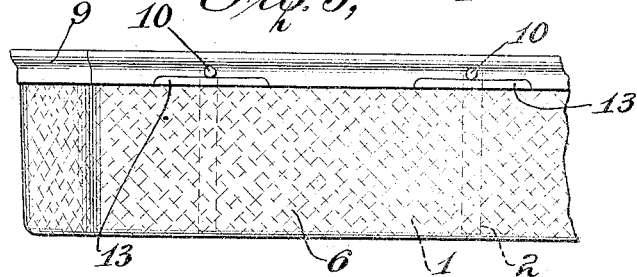
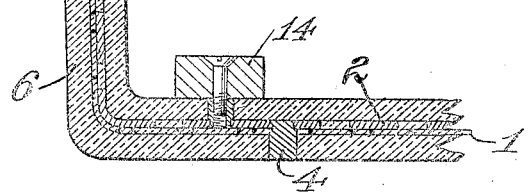
INVENTOR
Hiram Tyree
BY
ATTORNEY

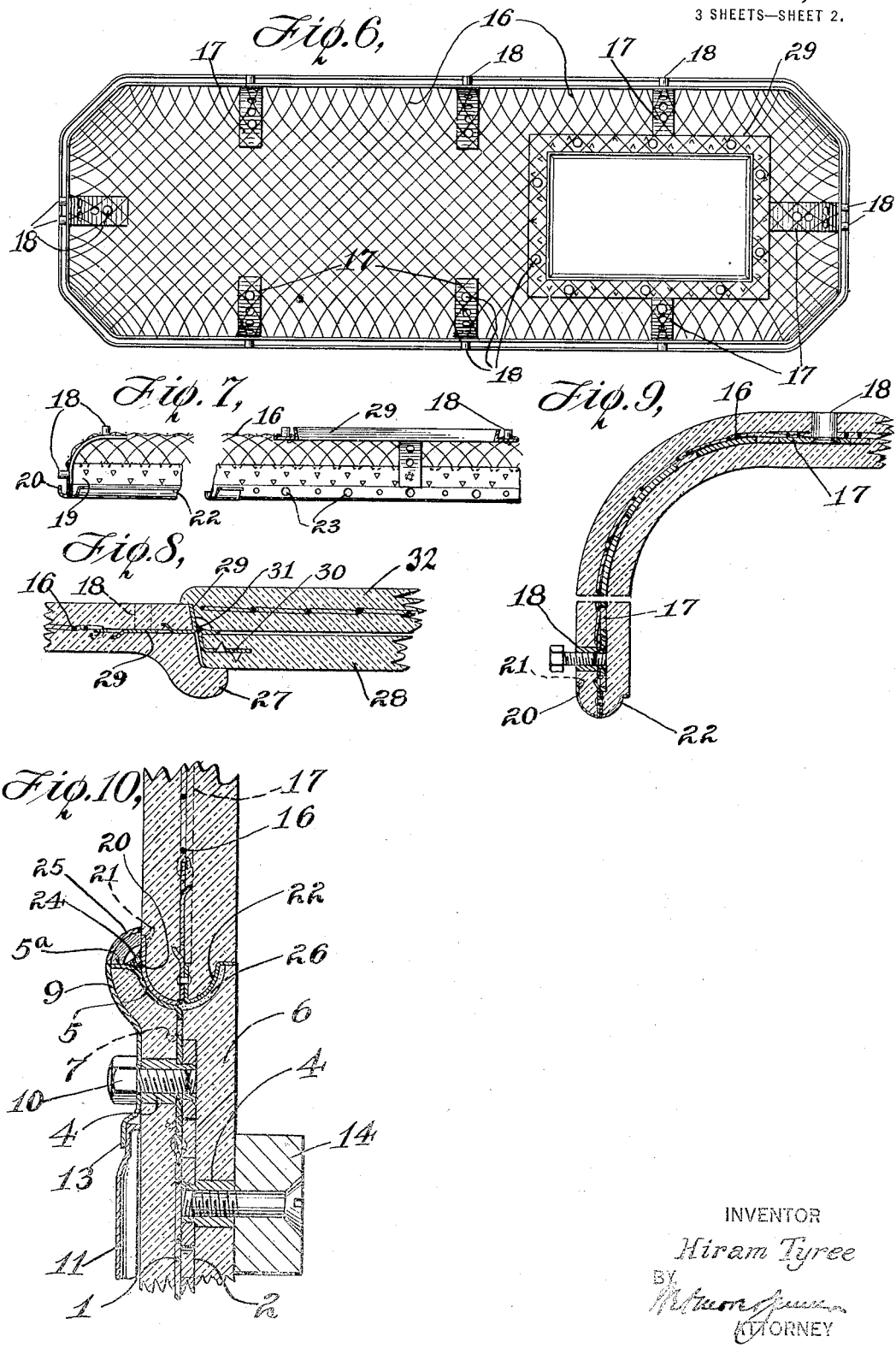
H. TYREE.
GLASS CASKET.
APPLICATION FILED APR. 8, 1918.
1,365,633. Patented Jan. 11, 1921.
3 SHEETS—SHEET 2.
INVENTOR
Hiram Tyree H. TYREE.
GLASS CASKET.
APPLICATION FILED APR. 8, 1918.
1,365,633.
Patented Jan. 11, 1921.
3 SHEETS—SHEET 3.
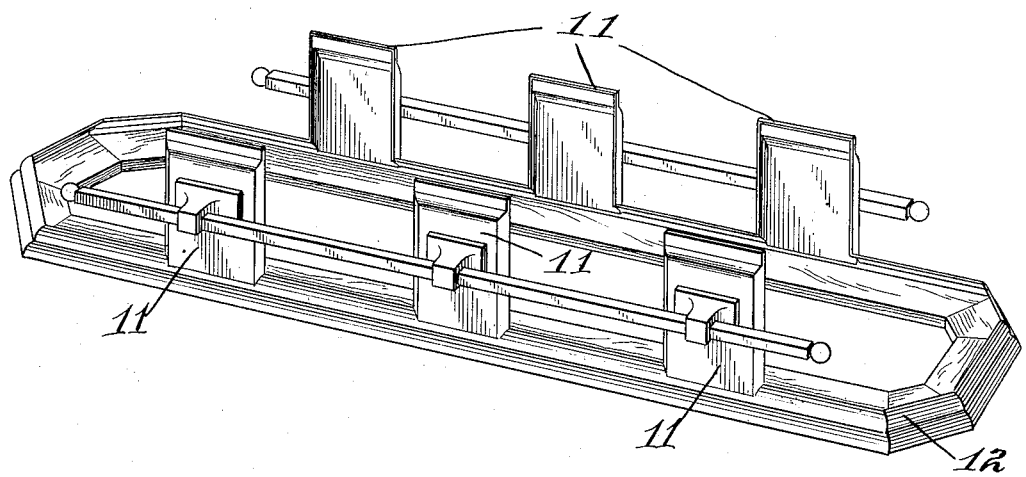
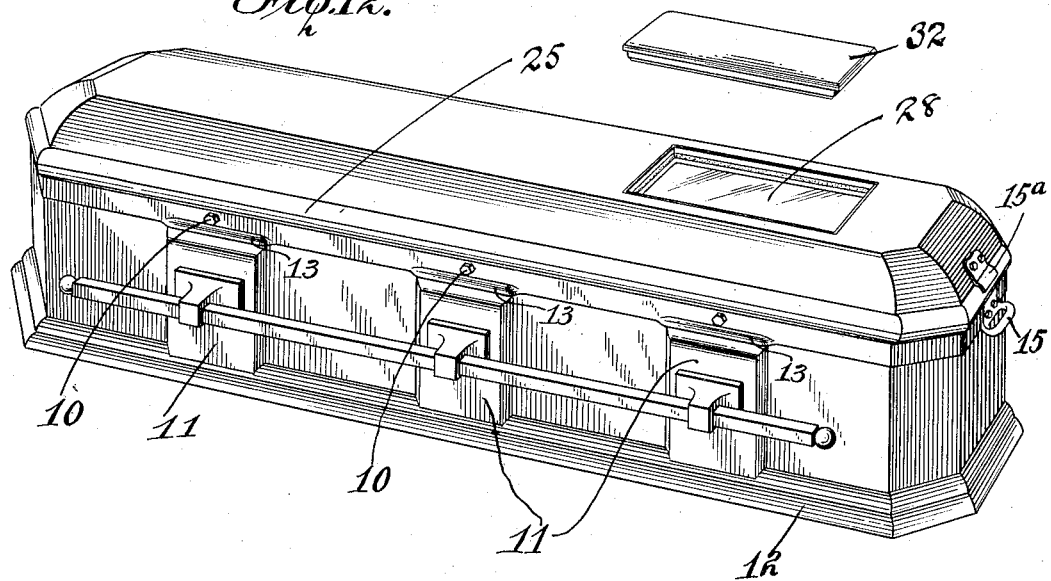
INVENTOR
Hiram Tyree
BY
ATTORNEY

UNITED STATES PATENT OFFICE.

HIRAM TYREE, OF NEW YORK, N. Y., ASSIGNOR TO INTERNATIONAL GLASS CASKET COMPANY, OF WILMINGTON, DELAWARE, A CORPORATION OF DELAWARE.

GLASS CASKET.

1,365,633.  Specification of Letters Patent.  Patented Jan. 11, 1921.

Application filed April 8, 1918. Serial No. 227,182.

*To all whom it may concern:*

Be it known that I, HIRAM TYREE, United States citizen, residing in New York, N. Y., have invented the following described Improvements in Glass Caskets.

The invention provides a relatively light, strong and imperishable casket structure made of reinforced vitreous or similar fictile material, possessing various advantages not heretofore available in this art, as hereinafter disclosed. The principal objects of the invention are to produce an organization of the fictile material and its reinforcement in such form and arrangement as to enable the caskets to be efficiently manufactured in plunger molds and at a minimum cost and to be closed by a soldered metallic seam or seal which permanently attaches the cover to the casket body either with or without the aid of cement, the use of which is also provided for, and also to improve the utility and appearance of glass caskets in general and to simplify and reduce the cost of finishing the same. The means of obtaining these and various other objects are below explained in connection with the accompanying three sheets of drawings, wherein—

Figure 1 is a top plan of the casket reinforcement framework;

Fig. 2 a side elevation thereof in slightly reduced scale;

Fig. 3 a detail cross section of the framework;

Fig. 4 a cross section of the wall structure of the casket body;

Fig. 5 a side elevation thereof;

Fig. 6 a plan view of the basket framework for the cover;

Fig. 7 a side elevation thereof, partly in section;

Fig. 8 a detail of the joint structure between the cover and the window closure;

Fig. 9 a cross section of the cover structure;

Fig. 10 an enlarged detail of the joint between body and cover;

Fig. 11 a perspective view of a platform carrier for the casket; and

Fig. 12 a view of the casket supported in the carrier.

In the particular form of casket taken for illustration the body and cover members are both formed in the same general manner and are of identical structure except for their relative proportions and certain differences due to the requirements of the joint structure and the provisions of a window in the cover, which is optional. Referring to the body, it is constituted of a basket-form framework shown in Figs. 1, 2 and 3, made of metallic wire 1, supported on a number of knee braces 2 and the latter are united and spaced by a longitudinal sheet metal rim strip 3 extending continuously around the structure and riveted to the knees. In Figs. 1 and 2 the wire fabric is diagrammatically indicated but will be understood to be wire netting such as indicated in Fig. 3 or an equivalent reticulated sheet metal fabric suitable to be molded in glass. The specific manner of fabricating the basket and its component parts is subject to the usual mechanical modifications to suit the requirements of standardized manufacture and there is no limitation herein to any particular organization of the basket members so long as the results hereinafter explained are thereby produced. The wire is tightly stretched over the knees and clipped or wired thereto and to a row of holes in the lower edge of the rim 3 previously punched therein for this purpose and as indicated in Fig. 3. The basket as thus formed having been given the shape desired for the casket body, is provided with a number of projecting spacer studs 4 distributed over its interior and exterior surface and all of substantially the same length. Some of them are tubular and interiorly threaded and some of them serve the function of rivets for securing the knees to the rim as well as for securing the wire to the knees. The studs on the outside of the basket are adapted to abut against the wall surface of the die cavity of the plunger mold in which the vitreous casket body is formed and so as to space the framework an appropriate distance therefrom, and the interior studs are for similar engagement with the surface of the mold plunger, both sets coacting to bring the framework into a properly centralized position within the molded vitreous wall. The end faces of the studs will then be left exposed on the surface of the finished vitreous wall and flush therewith and thereby those of the studs which are internally threaded are available to serve as attachment means for the exterior as well as for the interior finishing members. The longitudinal rim strip 3 of the basket is bent over at its upper margin forming a flange 5 of any suitable contour but preferably sloped downwardly and inwardly substantially as shown in Figs. 4 and 10, the lateral dimension of the flange being such that when the basket is placed in the mold cavity its peripheral edge will meet the adjacent side wall of the mold and so that when the mold plunger descends and forces the plastic material through the basket framework, the upward flow of said material thereby produced will be limited by the flange which thus functions as a part of the mold. It will be understood that the mold cavity and its plunger are formed of suitable complementary shapes to give the finished molded wall its desired contour, as well understood in the art, and the said mold members are desirably so formed in the present case that the resulting molded structure will have the cross-sectional appearance partially indicated by Fig. 4, the basket framework being centrally embedded in the vitreous wall 6 with the studs 4 reaching to the opposite surfaces thereof, the lower part of the rim structure being also embedded, and the upper part or flange 5 thereof forming a metallic surface or edge to the vitreous wall snugly fitting thereon because the glass has been forced while in a plastic state against its under face. Inasmuch as this flange by virtue of its rolled shape and cross-sectional curvature is relatively stiff, though of light sheet metal, it is substantially free from distortion under the pressure of the plastic glass and the resulting edge is therefore produced straight and true and proof against sticking and thereby it is specially suited to serve as a joint member. The lower part of the rim strip which is embedded in the vitreous wall is desirably freely perforated to facilitate the flow of the plastic glass under the flange and some of the perforations are formed by punching out barbs 7 to give additional though perhaps unnecessary anchorage. As a matter of preference the rim of the vitreous casket body is so shaped at the side of the flange 5 as to provide a rabbet groove with a rounded bottom. The metallic rim strip projects to the exterior of the glass at the bottom of this groove so that one-half of the groove is thus metal covered and the other half, marked 8, remains a vitreous surface.

It will be apparent that the metallic rim strip is susceptible of various molding contours according to preference, but of whatever shape selected the junction or meeting line of the glass with its free edge is apt to be rough from the molding process and for this purpose an external molding trim 9, of sheet metal if desired, is bolted to the upper set of studs 4 by means of the ornamental headed bolts 10 and so as to meet the edge of the flange 5 and continue and complete the finish represented thereby. The said external molding also serves to cover and conceal the upper edge of the finishing fabric, not shown in the drawings, but which is sometimes glued to the outside surface of the vitreous wall and it also serves a further purpose of receiving and laterally sustaining the side members 11 of a carrying platform 12 on which the casket is transported as shown in Figs. 11 and 12. For this purpose the lower edge of the said external trim 9 is bent outwardly at intervals forming pockets 13 to receive and conceal the ends of the platform members 11.

The casket body is finished interiorly by means of a light wooden framework represented by the strips 14 appearing in Figs. 4 and 5 and which are screwed into some of the interiorly projecting studs 4. The interior upholstery fittings may be tacked to this framework. A handle 15 is also bolted to the pairs of external studs 16 at each end of the casket body, such handles being for the purpose of lifting the body in order to place it in its carrying platform.

Referring now to the cover member of the casket as shown in Figs. 6 to 9 and also appearing in Fig. 10, it is molded of vitreous material in the same way as the body and with its walls embedding a metallic wire covered framework also supplied with knees 17, spacing studs 18 and a continuous sheet metal rib member 19 partly embedded in the vitreous wall material and partly exposed to form a metallic flange 20 of the same function as the body flange 5 and providing a rim surface for the cover corresponding to that on the body. The said flange 20 is curved or shaped so as to be complementary to the rabbet groove in the body in which it seats and is provided with a series of barbs 21 to anchor it firmly, at its peripheral edge, to the glass surface. A supplemental flange 22 may be also riveted to the flange 20, if desired, to make the cover rim metallic for its full width but this is not essential and in case of its use the riveted portions of the flanges should be freely perforated as indicated at 23 to admit the plastic glass to the interior of both flanges. It will be understood that the cover is also made in a plunger mold the same as the body and that its spacer studs and rim flange serve the same function as the corresponding parts of the body, so that the molded structure conforms in section to the illustration in Fig. 9. Certain of the exterior studs 18 may be internally threaded to receive bolts as indicated in Fig. 9 when for any purpose additional molding is desired for the cover.

When the cover is seated on the body the metallic rim surfaces thereof, represented by the flanges 5 and 20 are proximate or in contact and the downwardly and inwardly sloped surface of the body flange serves to center the cover with reference to the body at the same time providing a crevice between the proximate metallic surfaces which opens upwardly and is therefore suited to receive a filling of solder or a fused metal of some kind which adheres to the metal of the said surfaces and thereby produces a hermetic, permanent closure identical with that made in the case of lead casting and commonly called a "fire seal." The joint between the two united members is formed in part of the lateral or horizontal face 5ª and in part by the upstanding vertical face of the flange 20, both of which are adherent to solder so that a liberal seam or seal of that material may be run along the angle between said faces as indicated at 24, which not only seals the members of the joint but permanently unites them against separation. When the joint has thus been soldered the lateral surface 5ª forms a support for a light molding trim 25 which can be dropped over the cover into position on the rim and serves as concealment for the joint. In addition to the soldered joint, ordinary cement may likewise be used on the inner side 8 of the rabbet groove that is to say between the glass side of said groove and cover as indicated at 26. Such cement when used not only adds its adhesive force to the closure but serves as a tinker's dam to obstruct entrance of melted solder into the interior. The cover handles 15ª are fastened to the two exterior studs 18 at each end of the cover, similarly to the handles 15 on the body, screws with ornamental heads being used for the purpose in both cases. The cover, like the body, may be covered with cloth fabric pasted thereon, the edge of the latter being concealed by the trim 25 or by a special molding secured to the cover by means of screws in the studs 18.

When it is desired, a window may be formed in the cover for which purpose it is molded with a seat rim 27 around an opening adapted to receive a clear glass plate or slab 28 (Fig. 8). The basket framework for this purpose is provided with a sheet metal rim and flange similar in formation to the flanges 5 and 20 and for the purpose of providing a metallic surface around the window opening. The clear glass slab 28 is molded or cast with a complementary metallic rim 30 incorporated in its edge in such position as to be proximate to the rim 29 when the slab is in place closing the window opening. A solder seam 31 may then be run around the joint as indicated in Fig. 8 and thereafter a supplemental cover plate 32 may be placed in the opening to cover the joint. The carrier separately shown in Fig. 11 is formed of sheet metal and wood or wood fiber and conforms to the shape and size of the casket with which it is to be used. It comprises a main base 12 and one or more upstanding side members 11, which are preferably formed of sheet metal stampings securely attached to the base 12 and of such height as to interlock with the casket structure when the latter is placed upon the platform, as for instance, by engaging the sockets 13 above described. The handles or bars by which the platform is carried are secured to these upright side members and can be attached to them at any height desired, so that the platform with the casket on it may be conveniently transported. The interlocking engagement of a plurality of side members such as 11, with the casket structure is not necessarily called upon to carry the weight of the casket which it may do if desired, but its principal purpose is to reinforce the said members against lateral displacement and keep them snugly against the casket wall so that they will appear as a part of it and by this arrangement also the carrier may be made of very light construction and of skeletonized form without sacrifice to strength.

Having now described the principles of my invention in connection with the form at present preferred it will be understood that except as specified in the following claims the said principles may be physically incorporated in casket structures of widely varying appearance and that many additions and subtractions, reversals of parts and changes of proportions may be resorted to without departure therefrom.

Claims:

1. A casket comprising a vitreous body and cover having a joint structure the meeting surfaces whereof are rendered adherent to a solder introduced between them.

2. A casket comprising integral vitreous walls, a metallic strip molded therein and projecting to the exterior of the walls along the edge thereof to form a metallic seating for a cover.

3. A casket comprising vitreous body and cover walls having metallic strips embedded in their respective edges and fashioned for mutual engagement in a joint with an upstanding metallic wall surface adapting said joint to be sealed with solder or fused metal.

4. A casket comprising integral vitreous walls having embedded therein a metallic reinforcing framework which includes a continuous sheet metal rim projecting to the exterior of the vitreous material along the edge of said wall to render the edge adherent to a solder.

5. A casket composed of integral vitreous walls constituting the body and cover members thereof, each containing a metallic reinforcing framework molded therein and provided with an embedded sheet metal rim, part of which projects to the exterior of the vitreous material and forms a metallic seating for the similar rim of the other member.

6. In casket construction, a basket form metallic reinforcing framework adapted to be embedded in vitreous casket walls, a plurality of studs carried thereby projecting in distributed relation from the exterior of the basket and adapted to support the same against the walls of a plunger mold, some of said studs being tubular and internally threaded to constitute attachment means.

7. In casket construction, a basket form metallic reinforcing framework adapted to be embedded in vitreous casket walls and bearing a plurality of studs projecting in distributed relation from the outer and inner surfaces of the basket to support the same in a mold, some of said studs on each side of the basket being internally threaded and forming attachment means for the exterior trim and the interior finishing respectively.

8. In molded vitreous casket construction, a basket-form metallic reinforcing framework adapted to be embedded in vitreous casket walls and bearing a plurality of projecting spacing studs adapted to abut by their ends upon a wall of the mold and a rim member in said framework having a flange laterally extending to abut against the mold wall and adapted to form a limit to the plastic vitreous material.

9. In molded vitreous casket construction, a basket-form metallic reinforcing framework adapted to be embedded in vitreous casket walls and comprising knee braces and a metallic rim strip uniting and spacing the knee braces, said metallic rim strip having a continuous flange adapted to form a mold limit to the vitreous material during the molding process and thereafter forming a metallic surface.

10. In casket construction a basket form metallic reinforcing framework adapted to be embedded in vitreous casket walls and comprising knee braces and a metallic rim strip uniting and spacing the knee braces, a portion of said strip being disposed outside of the vitreous material to form a seat surface and the embedded part of it being provided with punched anchor barbs.

11. In vitreous casket construction, a joint structure comprising upper and lower vitreous joint members each provided with a metallic seat surface and the lower surface being sloped inwardly and downwardly.

12. In vitreous casket construction, a rim-structure consisting of a sheet metal basket rim, partially embedded in the vitreous casket walls and bearing a stud protruding from said embedded part to the exterior of said wall and the exposed part of the rim serving as the exposed surface of the edge of said wall and an exterior molding secured to said stud and forming a downward continuation of said metal surface.

13. A casket comprising a vitreous body and cover, containing metallic reinforcements molded therein, a window in the cover and a closure for the window, the joint surfaces between said cover and body and between said cover and closure being rendered adhesive to an interposed seal of fused metal.

14. A casket comprising vitreous body and cover having a rabbet groove joint, the proximate surfaces whereof are rendered adhesive to a solder and a molding adapted to rest on the horizontal edge of the rabbet joint to conceal the soldered junction.

15. The combination with a vitreous casket structure having a metallic reinforcing frame work molded therein and providing a metal rim, of a separate carrier therefor formed to interlock with the metal rim.

16. The combination with a vitreous casket structure having a metallic reinforcing frame work molded therein and providing a metal rim, of a separate carrier therefor having upstanding side members each having interlocking engagement with the metal rim.

17. The combination with a vitreous casket structure, of a separate carrier therefor, comprising upstanding side members and means embedded in the casket structure for holding said members to it.

18. A casket comprising a vitreous body, a cover, a metallic rim fixed to and disposed about the edge of said body, and a metallic rim fixed to and disposed about the edge of said cover, said rims providing meeting surfaces between said body and cover.

19. A vitreous casket comprising separate sections of vitreous material and a metal rim strip fixed in and extending along the edge of each section, the vitreous sections being assembled with the metal rims in contact and the latter adapting the joints to receive a solder to hermetically seal the casket.

In testimony whereof, I have signed this specification.

HIRAM TYREE.